US012745765B2

(12) United States Patent
Arnoldussen

(10) Patent No.: US 12,745,765 B2
(45) Date of Patent: Sep. 29, 2026

(54) METHOD AND DEVICE FOR CONTROLLING PLANTS, PEST AND WEED POPULATIONS IN FROZEN SOIL

(71) Applicant: Winterleap AS, Ås (NO)

(72) Inventor: Cornelis Arnoldussen, AAS (NO)

(73) Assignee: Winterleap AS, Ås (NO)

( * ) Notice: Subject to any disclaimer, the term of this patent is extended or adjusted under 35 U.S.C. 154(b) by 0 days.

(21) Appl. No.: 18/717,437

(22) PCT Filed: Dec. 16, 2022

(86) PCT No.: PCT/EP2022/086453
§ 371 (c)(1),
(2) Date: Jun. 7, 2024

(87) PCT Pub. No.: WO2023/111312
PCT Pub. Date: Jun. 22, 2023

(65) Prior Publication Data
US 2025/0008942 A1 Jan. 9, 2025

(30) Foreign Application Priority Data
Dec. 17, 2021 (NO) .................................... 20211538

(51) Int. Cl.
*H05B 6/80* (2006.01)
*A01M 21/04* (2006.01)

(52) U.S. Cl.
CPC ............ *A01M 21/046* (2013.01); *H05B 6/80* (2013.01); *H05B 2206/045* (2013.01)

(58) Field of Classification Search
CPC .. A01M 21/046; H05B 6/80; H05B 2206/045
See application file for complete search history.

(56) References Cited

U.S. PATENT DOCUMENTS 3,753,134 A * 8/1973 Unterberger ............ G01S 13/10 324/330
3,828,245 A * 8/1974 Unterberger ............ G01V 3/17 324/330
4,370,534 A 1/1983 Brandon
4,590,348 A * 5/1986 Lahti ......................... E02D 3/11 219/710
6,401,637 B1 6/2002 Haller
(Continued)

FOREIGN PATENT DOCUMENTS

CN 102487930 A * 6/2012
CN 105941382 9/2016
(Continued)

OTHER PUBLICATIONS

CN-102487930-A Translation (Year: 2012).*
(Continued)

*Primary Examiner* — Kimberly S Berona
*Assistant Examiner* — Steven J Shur
(74) *Attorney, Agent, or Firm* — Alix, Yale & Ristas, LLP

(57) ABSTRACT

The invention relates to plant control and agriculture technology. More specifically a method and device for reducing or eliminating invasive alien plants, live pests or weeds located in frozen soil, wherein the method and device is adapted for generating microwave radiation with a frequency from about 915 MHz to about 24 GHz.

16 Claims, 7 Drawing Sheets

(56) References Cited

U.S. PATENT DOCUMENTS

| | | | | |
|---|---|---|---|---|
| 2003/0215354 | A1 * | 11/2003 | Clark | H05B 6/80 422/38 |
| 2010/0322713 | A1 | 12/2010 | Hegg | |
| 2020/0107539 | A1 | 4/2020 | Brodie et al. | |

FOREIGN PATENT DOCUMENTS

| | | | | |
|---|---|---|---|---|
| CN | 110278935 | | 9/2019 | |
| KR | 101520881 | A | 5/2015 | |
| WO | WO 2018/112531 | | 6/2018 | |
| WO | WO-2021152594 | A1 * | 8/2021 | A01M 21/046 |

OTHER PUBLICATIONS

Norwegian Search Report dated Jul. 22, 2024, submitted inter alia as Satement of Relevance for non-English refs cited therein.

ISRWOISA dated Mar. 16, 2023, submitted inter alia as Statement of Relevance for non-English refs cited therein.

Office Action dated Mar. 14, 2026 for Chinese Patent Application No. 202280091111.0, with English translation.

* cited by examiner

METHOD AND DEVICE FOR CONTROLLING PLANTS, PEST AND WEED POPULATIONS IN FROZEN SOIL

FIELD OF THE INVENTION

The invention relates to plant control and agriculture technology and more specifically to a method for reducing invasive alien plants, pests or weeds located in soil, wherein the method involve the use of microwave radiation aiming to affect the invasive alien plant's, pest's and weed's ability to survive in frozen soil.

INTRODUCTION

Population growth demands an incise in global food production. In order to meet this target, farmers must control pests in the soil.

Weeds compete with vegetables for nutrients, pests may make crops unsellable, and mold and fungus reduce storage time, resulting in food waste. Moreover, invasive species such as certain weeds and nematodes are a major cause of crop loss and can adversely affect food security.

Although agricultural pesticides have proven useful in improving yield and reducing waste, they pose significant health and environmental hazards. Since pesticides treat only the top layer of soil and do not kill weed seeds, repeated applications at high concentrations are often required. Over time, weeds, pests and pathogens may achieve pesticide resistance.

There is also an increasing problem of controlling the spread of invasive alien plants which can damage local nature in different ways such as change the structure of the habitat, displace plants that are found naturally on the site through competition for nutrients and living areas. The invasive alien plants may also interbreed with plants naturally found in the area and carry parasites and diseases.

It has been shown that treatment of soil using steam can reduce or remove soil pathogens however the use of steam requires heavy and large machines and often result in sterilization of the soil.

Steam is less useful if the soil is very wet and steaming requires a lot of water and energy, thus making this technology less environmentally friendly.

Microwave radiation of non-frozen soil to decrease or destroy fungus, pathogens, weed seeds and weed roots is known, EP3629724, U.S. Pat. No. 1,025,870, Brodie, G. et al., Microwave soil treatment and plant growth, IntechOpen, 24 Oct. 2019.

Methods involving microwave treatment of non-frozen soil, are based on attenuation of the radiation in water molecules which affect both temperature of the soil and the penetration depth of the microwaves into the ground.

Due to the attenuation of the microwave radiation in water molecules in the soil, microwave radiation is only able to penetrate a few centimeters into the ground, thus making the method less efficient.

In addition, the attenuation of the microwaves in water molecules increases the temperature close to the antenna resulting in heating of the moist in the soil to melting temperatures that boils the soil. The boiling temperature of the soil eliminates pests by sterilization.

By sterilization of the soil, nitrification bacteria and other valuable organisms are also affected. The disadvantage of thermal heating of soils is that it affects the complete soil column and removes most species. Thus, this method requires a careful process afterwards to build up the soil biology by inoculation of lost valuable organisms.

Thus, there is a need for further efficient and environmentally friendly methods for plant, pest and weed control in agriculture, and other outdoor green areas such as gardens, parks, small local wood areas and areas along roads.

The present invention has as its objects to overcome one or more of the disadvantages of the present plant, pest and weed control methods by providing a method that affect the abilities for the plants, pests, weeds and/or grass to survive in frozen soil.

In particular, the inventor has surprisingly been able to design a method that reduce the plants, pest, weed and/or grass population by microwave radiation of frozen soil comprising plants, pest, weed and/or grass thereby selectively targeting by heating the plants, pests, weeds and/or grass without thawing the soil. The invention also comprises a device adapted for use in the method.

SUMMARY OF THE INVENTION

The present inventors have solved the above-mentioned need by providing in a first aspect a method for reducing invasive alien plants, pests, weeds and/or grass, wherein the method comprising:

a. providing a device adapted for generating microwave radiation; and
b. irradiating frozen soil comprising invasive alien plants, pests, weeds and/or grass;
   wherein the temperature of the frozen soil is below 0° C. and the microwave radiation is in the range from about 915 MHz to about 24 GHz, such as from about 1 Ghz to about 10 Ghz such as from about 1.5 Ghz to about 5 Ghz.

In one embodiment of the first aspect the microwave radiation is in the range from about 1.0 GHz to about 10 GHz.

In one embodiment of the first aspect the microwave radiation is in the range from about 1.5 GHz to about 5 GHz.

In one embodiment of the first aspect the microwave radiation has a frequency of about 915 MHz.

In one embodiment of the first aspect the microwave radiation has a frequency of about 2.45 GHz.

In one embodiment of the first aspect the microwave radiation has a frequency of about 5.8 GHz.

In one embodiment of the first aspect the microwave radiation has a frequency of about 24.125 GHz In one embodiment of the first aspect the device comprises a magnetron, a solid-state microwave generator or a Radio Frequency (RF) generator.

In one embodiment of the first aspect the effect generated by the device is from about 1 kW to about 300 kW.

In one embodiment of the first aspect the effect generated by the device is from about 1 kW to about 20 kW, such as about 3 kW.

In one embodiment of the first aspect the effect generated by the device is from about 1 kW to about 300 kW, such as from about 1 kW to about 10 kW, such as from about 10 kW to about 50 kW, such as from about 50 kW to about 100 kW, such as from about 10 kW to about 150 kW, such as from about 150 kW to about 200 kW, such as from about 200 kW to about 250 kW or such as from about 250 kW to about 300 kW.

In one embodiment of the first aspect the device comprises a magnetron.

In one embodiment of the first aspect the device further comprises a waveguide and a horn antenna.

In one embodiment of the first aspect the device comprises components able to operate at air temperatures below 0° C., preferably components that are able to operates at air temperatures around −10° C. to about −20° C., wherein the components of the device comprises a high voltage transformer 22, a low voltage transformer for membrane 23, capacitors 24, diodes 25, a magnetron 26 and waveguide 27.

In one embodiment of the first aspect the device comprises components able to operate at air temperatures below 0° C., preferably components that are able to operates at air temperatures around −10° C. to about −20° C., wherein the components of the device comprises a high voltage transformer 22, a low voltage transformer for membrane 23, capacitors 24, diodes 25, a magnetron 26, waveguide 27, horn antenna 28.

In one embodiment of the first aspect the method reduces the invasive alien plants, pests, weeds and/or grass by at least about 30%.

In one embodiment of the first aspect the method reduces the invasive alien plants, pests, weeds and/or grass by at least about 50%.

In one embodiment of the first aspect the method reduces the invasive alien plants, pests, weeds and/or grass by at least about 80%.

In one embodiment of the first aspect the method does not sterilize the soil.

In one embodiment of the first aspect the method does not thaw the soil.

In one embodiment of the first aspect the pests are selected from fungus, fungal spores, nematodes, nematode eggs, and any combination thereof.

In one embodiment of the first aspect the pest is fungus.

In one embodiment of the first aspect the pest is a fungal spore.

In one embodiment of the first aspect the pest is a nematode.

In one embodiment of the first aspect the pest is a nematode egg.

In one embodiment of the first aspect weeds comprises weed seeds and weed roots.

In one embodiment of the first aspect weeds is a weed seed.

In one embodiment of the first aspect weeds is a weed root.

In one embodiment of the first aspect invasive alien plants are invasive alien plant roots or seeds.

In one embodiment of the first aspect the microwave radiation penetrates at least 10 cm into the ground.

In one embodiment of the first aspect the microwave radiation penetrates at least 20 cm into the ground.

In one embodiment of the first aspect the microwave radiation penetrates at least 30 cm into the ground.

In one embodiment of the first aspect the device is moved over the soil at a speed of from about 20 meter/hour to about 20 km/hour.

In one embodiment of the first aspect the device is moved over the soil at a speed of from about 30 meter/hour to about 20 km/hour, such as from about 20 meter/hour to about 50 m/hour, such as from about 50 meter/hour to about 100 m/hour, such as from about 100 meter/hour to about 500 m/hour, such as from about 500 meter/hour to about 1 km/hour, such as from about 1 km/hour to about 5 km/hour, such as from about 5 km/hour to about 10 km/hour or such as from about 10 km/hour to about 20 km/hour.

In one embodiment of the first aspect an effect generated by the device is varied depending on the speed of the device.

In one embodiment of the first aspect the device is in direct contact with the frozen soil.

In one embodiment of the first aspect the device is not in direct contact with the frozen soil.

In a second aspect the present invention provides a microwave generating device adapted for use in the method according to the first aspect wherein the device is adapted for generating microwave radiation in the range from about 915 MHz to about 24 GHz.

In one embodiment of the first aspect or the second aspect the microwave generating device is adapted for generating microwave radiation in the range from about 1.0 GHz to about 10 GHz.

In one embodiment of the first aspect or the second aspect the microwave generating device is adapted for generating microwave radiation in the range from about 1.5 GHz to about 5 GHz.

In one embodiment of the first aspect or the second aspect the microwave generating device comprises a magnetron, a solid-state microwave generator or a Radio Frequency (RF) generator.

In one embodiment of the first aspect or second the aspect the microwave generating device further comprises a waveguide and a horn antenna.

In one embodiment of the first aspect or the second aspect the microwave generating device comprises a magnetron.

In one embodiment of the first aspect or the second aspect the microwave generating device is the device depicted in FIG. 1*a*.

In one embodiment of the first aspect or the second aspect the microwave generating device is the device depicted in FIG. 1*b*.

In one embodiment of the first aspect or the second aspect the microwave generating device comprises a high voltage transformer, a low voltage transformer for membrane, capacitors, diodes, magnetron, waveguide, a cooling unit comprising cooling fluid.

In one embodiment of the first aspect or the second aspect the device comprises a high voltage transformer, a low voltage transformer for membrane, capacitors, diodes, magnetron, waveguide, horn antenna.

In one embodiment of the second aspect the device does not comprise large water tanks for absorbing microwave radiation reflected by the soil.

In one embodiment of the first aspect or the second aspect the device comprises a cooling unit which is dimensioned for cooling the device operating at air temperatures below 0° C., such as temperatures around −2° C. and below, such as air temperatures from about 0° C. to about −25° C.

In one embodiment of the second aspect the device does not comprise a shield to protect the device from microwave radiation reflected by the soil.

In one embodiment the device is mounted on a sledge.

In one embodiment the sledge comprises a hole in the area under the waveguide or antenna to allow free way of the microwaves from the horn antenna or the waveguide to the soil.

In a third aspect the present invention provides system adapted for use in the method according to the first aspect comprising at least one device.

In one embodiment of the third aspect the system comprises a frame or platform wherein a plurality of devices is mounted underneath.

In one embodiment of the third aspect the system comprising a frame or platform further comprising a cooling unit and a power generator.

In one embodiment the device or the system is arranged to be moved over the soil in direct contact with the soil.

In one embodiment the device or the system is arranged to be moved over the soil wherein the device is arranged not more than 20 cm above the top of the soil, such as from about 5 cm to about 20 cm.

In one embodiment the device or the system further comprises a propulsion device.

In one embodiment the device or the system is mounted on a sledge.

In one embodiment the device or the system is pulled by a vehicle such as a tractor.

In a fourth aspect the present invention provides use of a microwave generating device for reducing a population of invasive alien plants, pests, weeds and/or grass located in frozen soil wherein the temperature of the frozen soil is below 0° C. and wherein the microwave radiation is in the range from about 915 MHz to about 24 GHz.

In one embodiment of the fourth aspect the present invention provides use of a microwave generating device for reducing the population invasive alien plants, pests, weeds and/or grass located in frozen soil wherein the temperature of the frozen soil is below 0° C. and wherein the microwave radiation is in the range from about 1.0 GHz to about 10 GHz.

In one embodiment of the fourth aspect the present invention provides use of a microwave generating device for reducing the population of invasive alien plants, pests, weeds and/or grass located in frozen soil wherein the temperature of the frozen soil is below 0° C. and wherein the microwave radiation is in the range from about 1.5 GHz to about 5 GHz.

In one embodiment of the fourth aspect the use of microwave radiation reduces the population of invasive alien plants, pests, weeds and/or grass by at least about 30%.

In one embodiment of the fourth aspect the use of microwave radiation reduces the population of invasive alien plants, pests, weeds and/or grass by at least about 50%.

In one embodiment of the fourth aspect the use of microwave radiation reduces the population of invasive alien plants, pests, weeds and/or grass by at least about 80%.

List of Reference Signs

Figure 1A:
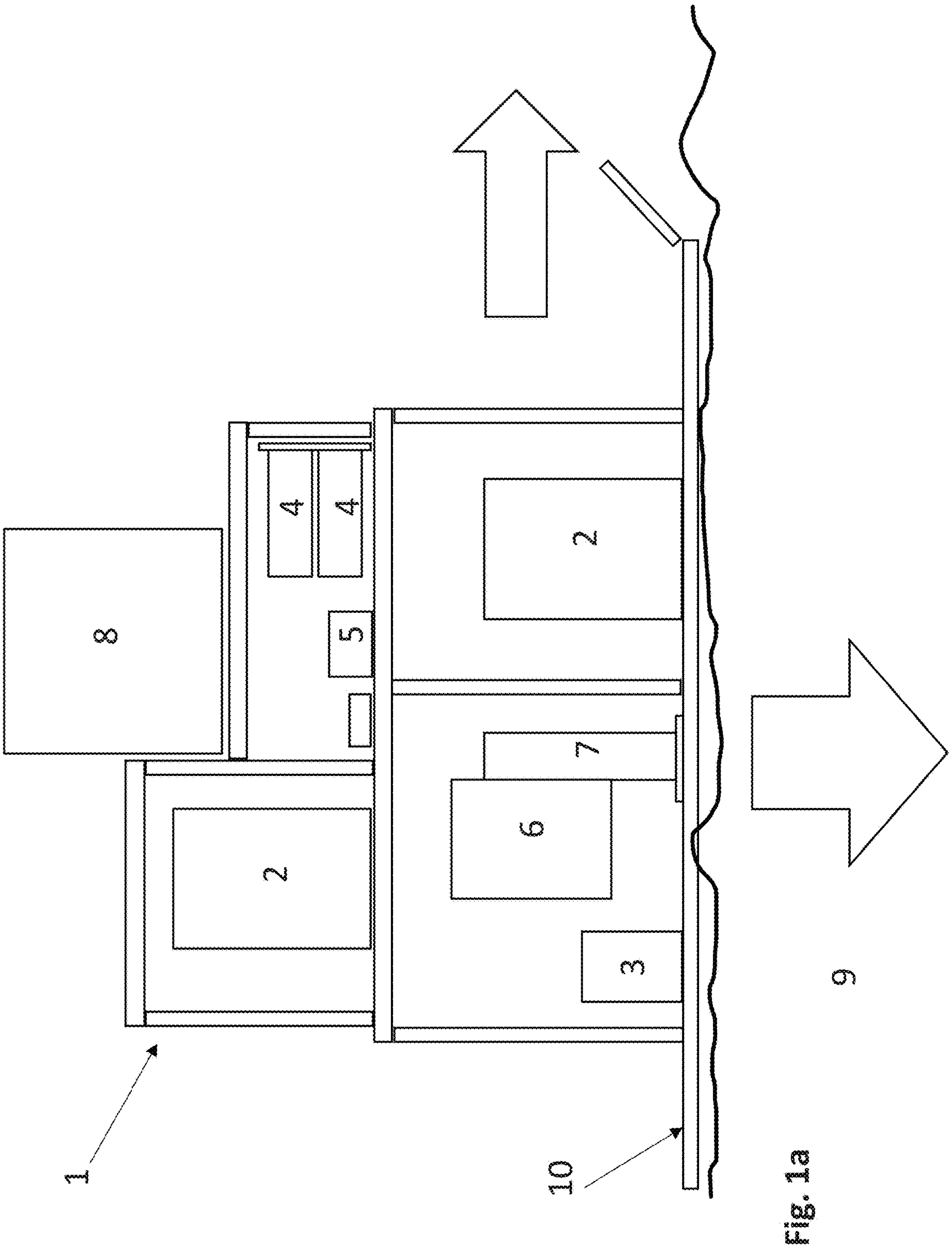
FIG. 1*a*: Depicts one embodiment of a device (device 1) for reducing the population of invasive alien plants, pests, weeds and/or grass in frozen soil wherein the device 1 comprises a high voltage transformer 2, a low voltage transformer for membrane 3, capacitors 4, diodes 5, magnetron 6, waveguide 7, a cooling unit comprising cooling fluid 8. The device is for illustration purpose only placed on a sledge 10. The sledge wherein the device is mounted is moved at certain speed on the top of the frozen soil. The device may alternatively comprise a propulsion device.

1 Device
2 High voltage transformer
3 Low voltage transformer for membrane
4 Capacitors
5 Diodes
6 Magnetron, 3 kW
7 waveguide, eg. WR340
8 Cooling unit comprising cooling fluid, eg. glycerol
9 Frozen soil
10 Sledge FIG. 1*b*: Depicts one embodiment of a device (device 21) for reducing the population of invasive alien plants, pests, weeds and/or grass in frozen soil wherein the device 21 comprises a high voltage transformer 22, a low voltage transformer for membrane 23, capacitors 24, diodes 25, magnetron 26, waveguide launcher 27, horn antenna 28. The device is for illustration purpose only placed on a sledge 20.

The sledge wherein the device is mounted is moved at certain speed on the top of the frozen soil. The device may alternatively comprise a propulsion device.

List of Reference Signs

21 Device
22 High voltage transformer
23 Low voltage transformer for membrane
24 Capacitors
25 Diodes
26 Magnetron, 3 kW
27 Waveguide, eg. WR340
28 Horn antenna
20 Sledge FIG. 1*c*: Depicts an example of a system comprising seven devices 21. The devices are mounted on sledges and the system is viewed from above. The devices may be attached to a frame or platform that is pulled by a tractor, see FIG. 1*d*.

Figure 1B:
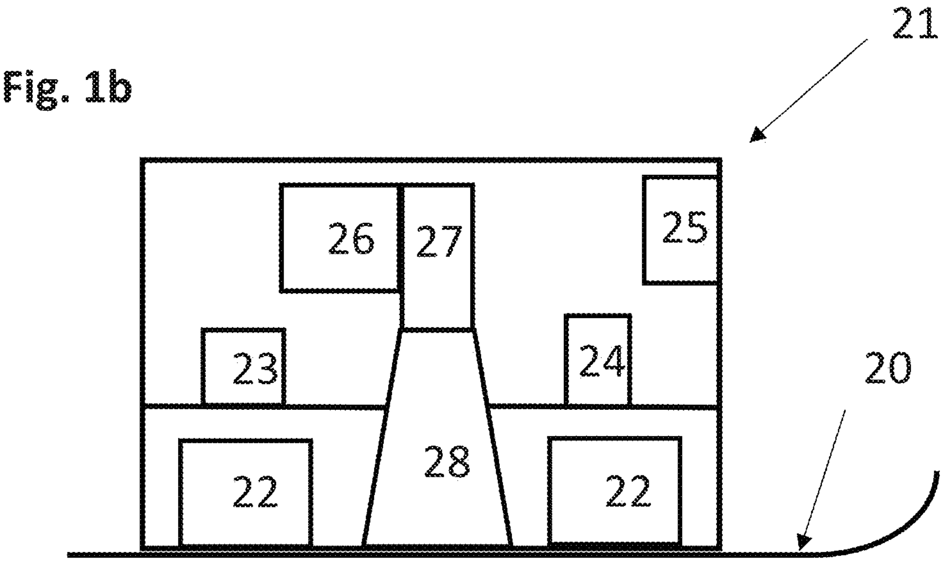
Figure 1C:
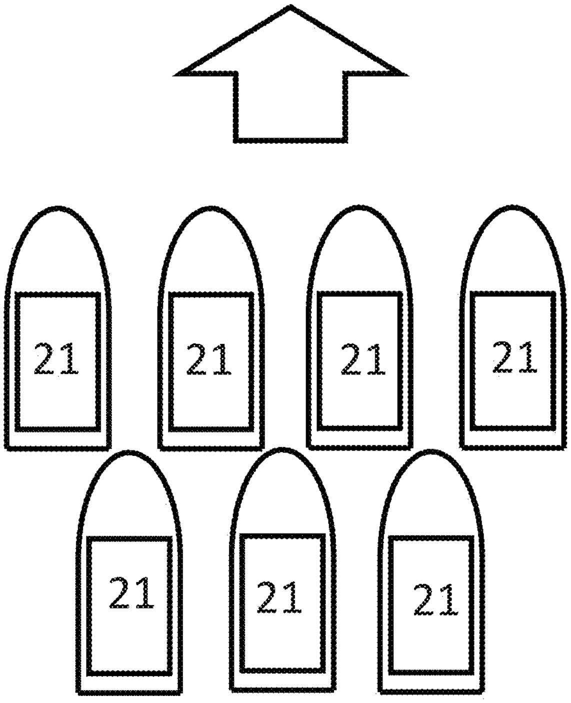
Figure 1D:
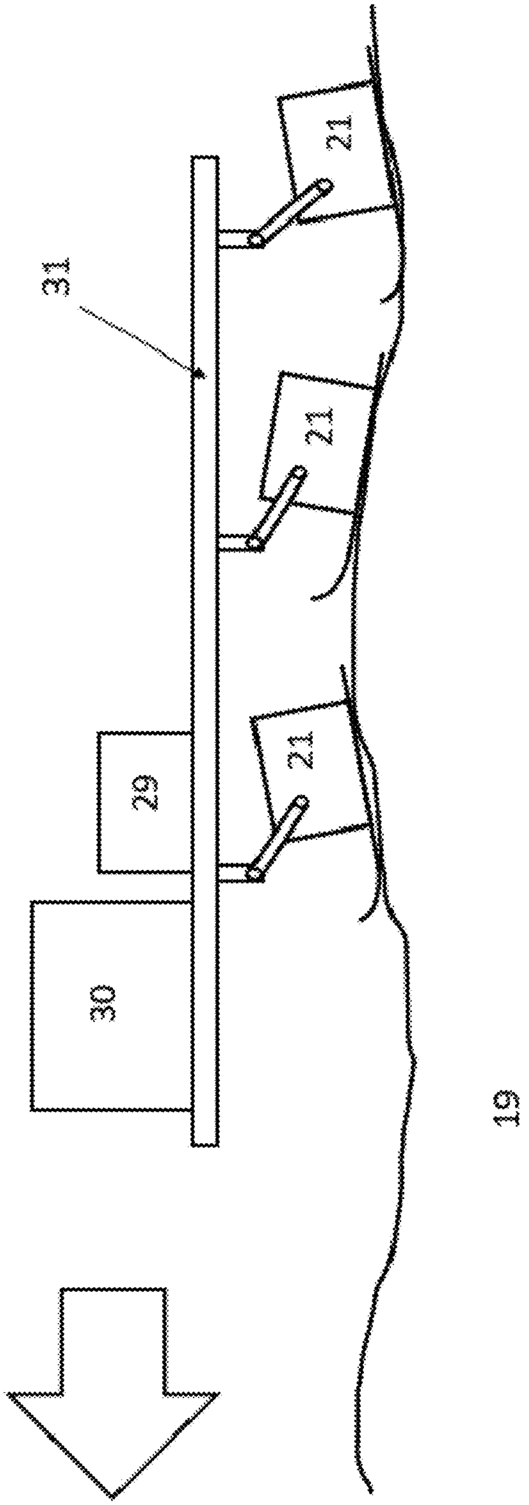

FIG. 1*d*: Shows an example of a system comprising three devices 21. The devices are mounted on sledges. Device 21, power generator 30, cooling system (eg. radiator) 29, platform or frame 31, frozen soil/ice/snow 19. The system may be pulled by a tractor.

Figure 2A:
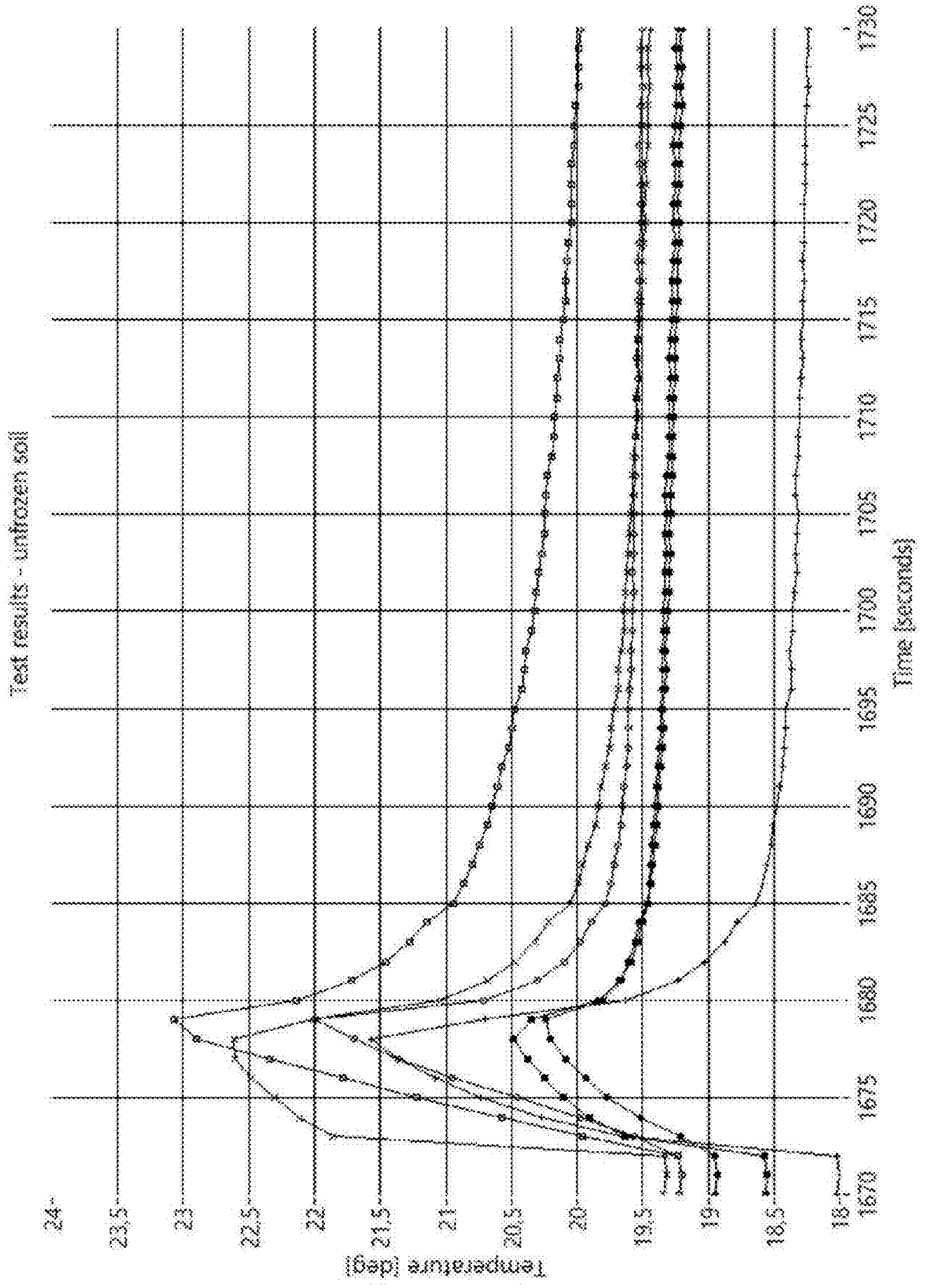

FIG. 2*a*: Microwave radiation of non-frozen soil. The curves illustrate the temperature change in the different objects and the surrounding soil. Magnetron was powered from seconds 1672 to 1679 seconds (total of 7 seconds).

| Depth [cm] | Object | Curve |
|---|---|---|
| 7 | Frost fluid in tiny swamp | □ |
| 7 | Soil (no object) | ■ |
| 12 | 0-0.02 ml frost fluid wrapped in plastic foil | ○ |
| 12 | Soil (no object) | ● |
| 18 | Small carrot piece | X |
| 18 | Soil (no object) | + |

Figure 2B:
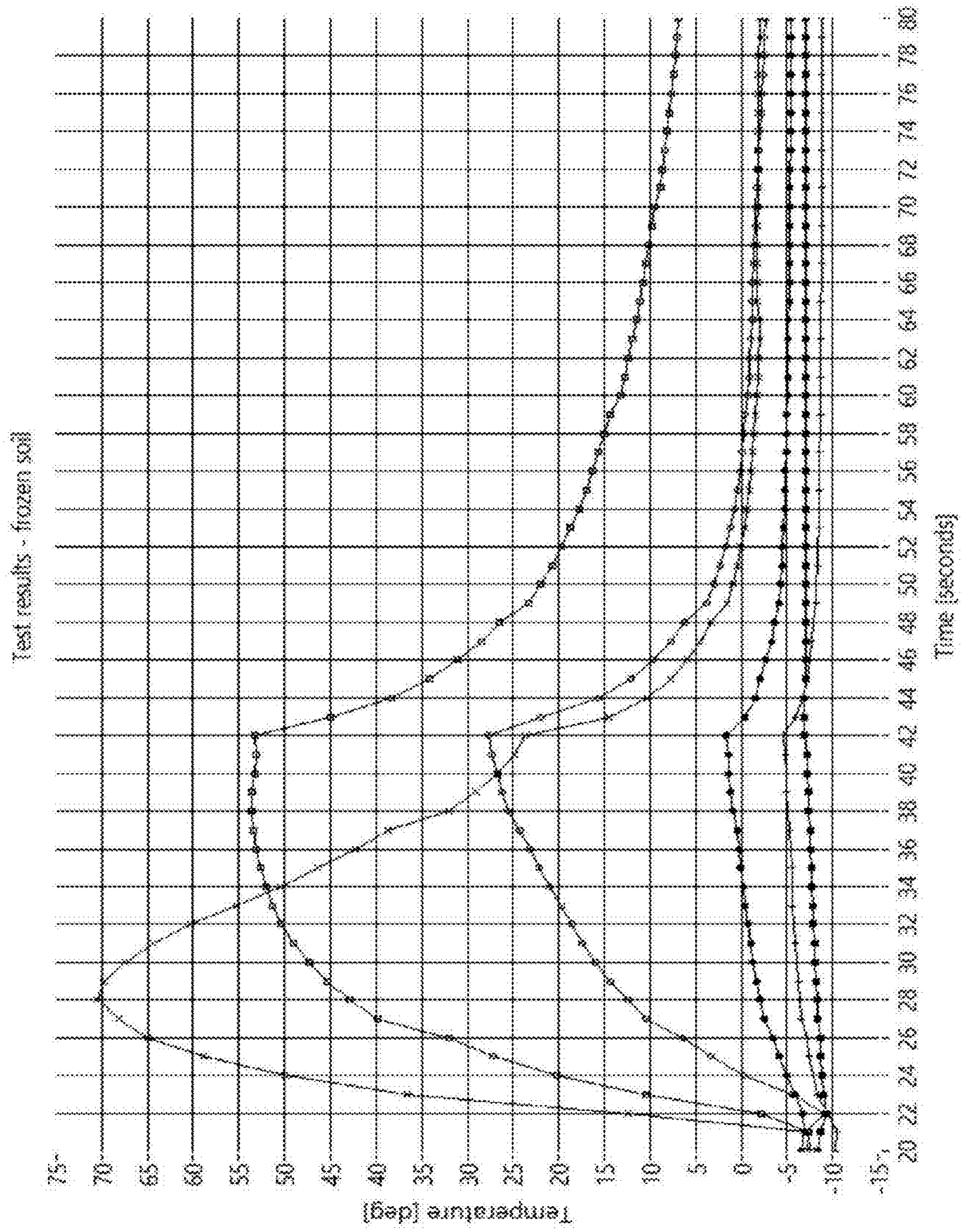

FIG. 2*b*: Microwave irradiation of frozen soil. The curves illustrate the temperature change in the different objects and the surrounding soil. The magnetron was powered on at seconds 21-42 (total of 19 seconds). After 7 seconds, at time 28 seconds, a significant change from the unfrozen soil test was observed.

| Depth [cm] | Object | Curve |
|---|---|---|
| 7 | Frost fluid in tiny swamp | □ |
| 7 | Soil (no object) | ■ |
| 12 | 0-0.02 ml frost fluid wrapped in plastic foil | ○ |
| 12 | Soil (no object) | ● |
| 18 | Small carrot piece | X |
| 18 | Soil (no object) | + |

Figure 3:
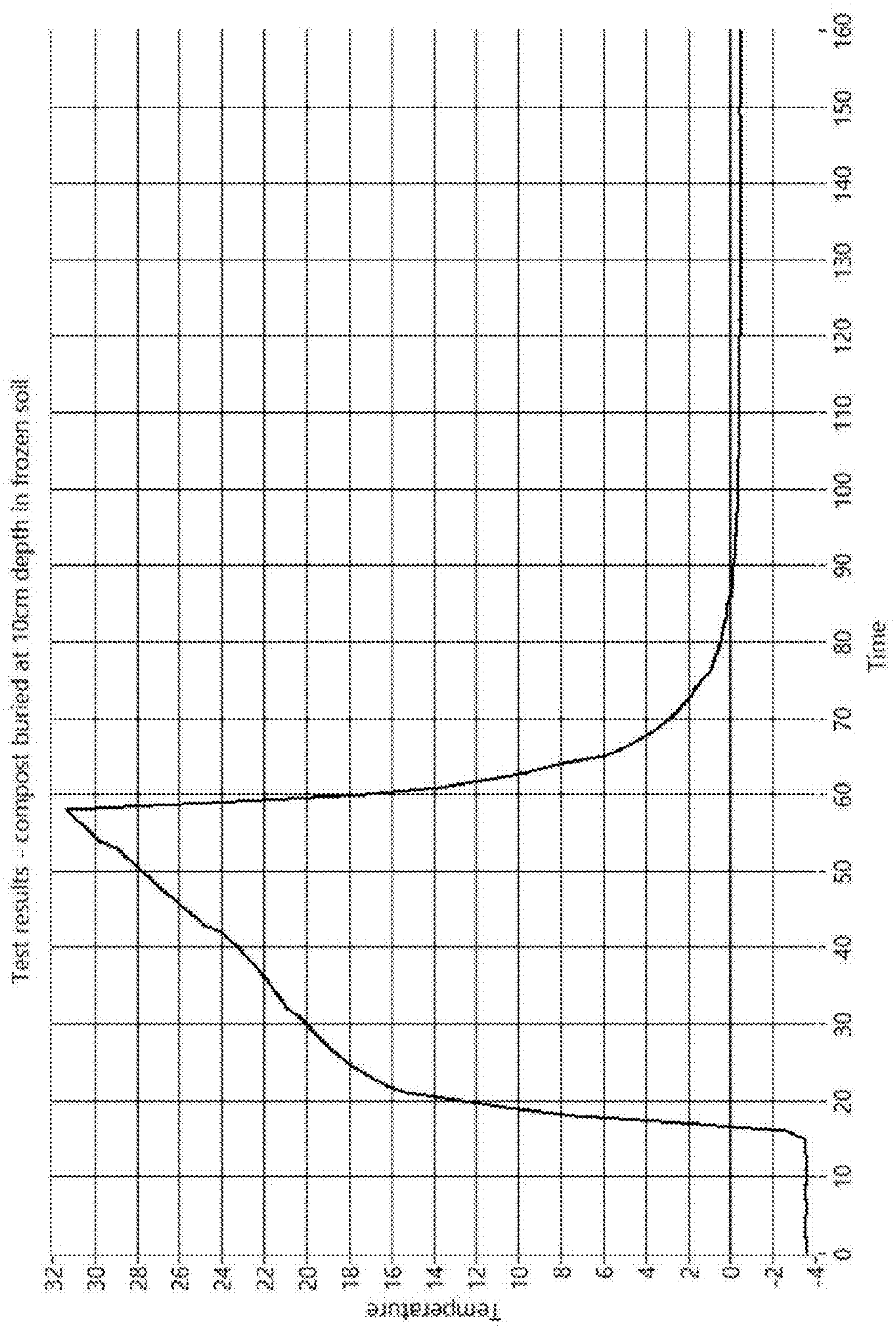

FIG. 3: Microwave radiation of frozen soil. The curve illustrates the temperature change in a small compost clump buried at 10 cm depth. The magnetron was powered on at seconds 15-57 (total of 42 seconds). Compost sample was analyzed with reference to a similar control sample.

Figure 4:
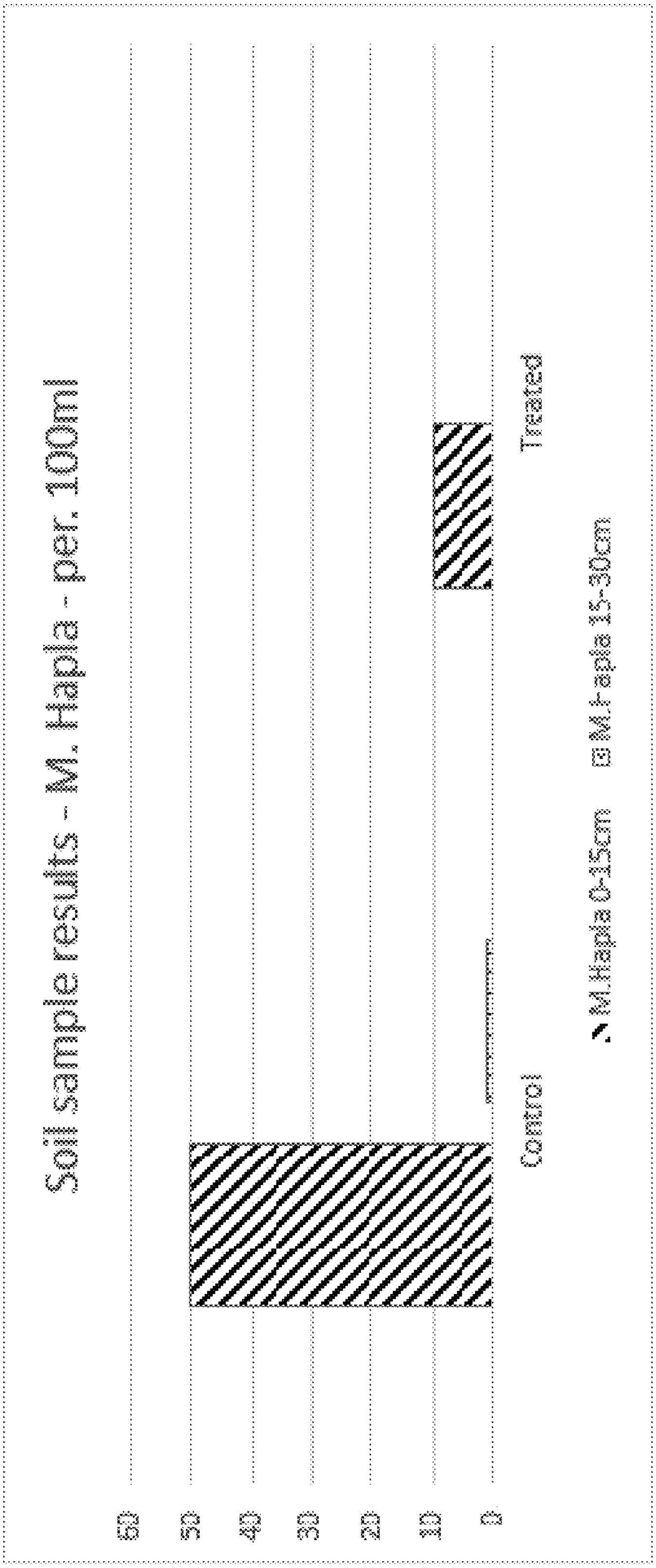

FIG. 4: Results from soil sample measuring the number of *Meloidogyne hapla* (*M. hapla*) nematodes per 100 ml of soil without microwave treatment of soil during winter (Control) and treated by microwave irradiation (Treated) wherein the samples are taken either from the upper 15 cm of the soil column or further down, 15-30 cm. The *M. hapla* nematode is manly found in the upper 15 cm of the soil column. Y-axis number of *M. hapla* per 100 ml of soil.

DETAILED DESCRIPTION

In the following description, various examples and embodiments of the invention are set forth in order to provide the skilled person with a more thorough understanding of the invention. The specific details described in the context of the various embodiments and with reference to the attached drawings are not intended to be construed as limitations.

Where a numeric limit or range is stated, the endpoints are included. Also, all values and subs range within a numerical limit or range are specifically included as if explicitly written out.

As mentioning above, the present inventor has surprisingly found a method for reducing invasive alien plants, pests, weeds and/or grass located in soil, wherein the method is applied to frozen soil, i.e. wherein the temperature of the soil is below 0° C. and wherein the method comprises a. providing a device adapted for generating microwave radiation; and b. irradiating the frozen soil; and wherein the microwaves radiation has a frequency of from about 915 MHz to about 24 Ghz, such as from about 1 Ghz to about 10 Ghz such as from about 1.5 Ghz to about 5 Ghz.

The microwave radiation may have a frequency of about 915 MHz. Alternatively, the microwave radiation may have a frequency of about 2.45 GHz. Alternatively, the microwave radiation may have a frequency of about 5.8 GHz. Alternatively, the microwave radiation may have a frequency of about 24.125 GHz.

The method being performed on frozen soil has a number of advantages compared to the same method performed on non-frozen soil such as:

Selective higher heating effect on the pests living in the soil rather than a complete heating of the non-frozen soil wherein the overall heating of the soil destroys the pests rather than direct targeting the pests in the frozen soil.

Without boiling or heating the soil the radiation does not completely sterilize the soil thus preventing destruction of valuable microorganisms in the soil. Thus, making the method more gentle and environmentally friendly compared to methods that sterilizes the soil.

Due to lower attenuation of the microwaves in frozen soil compared to non-frozen soil allows the use of higher frequencies compared to methods used on non-frozen soil. Higher frequency radiation is more efficient for destroying hard to kill invasive alien plants, pests and/or weeds.

Reduced attenuation of microwaves in frozen soil compared to non-frozen soil also have the advantage that less effect of is needed thus providing a method that requires less energy and prevents the need for a large unit for cooling the magnetron.

Higher depth penetration, effect on frequencies in the ISM band 915 Mhz, 2.45 Ghz, 5.8 Ghz and 24 Ghz as compared with non-frozen soil.

Reduced reflection of microwaves from air to soil, less energy waste.

Thus, the present invention provides a device and system that is smaller, lighter and less expensive and able to operate at temperatures below 0° C., preferably at temperatures below −2° C. and more preferably temperatures from about 0° C. to about −25° C. A device operating at air temperatures below 0° C. has to make use of components of the device that can withstand and operate at temperatures below 0° C.

Definitions

Soil is defined by the upper layer of earth in which plants grow, comprising organic remains, clay, rock particles and water in any combination.

Frozen soil is defined as soil wherein the temperature of the earth material is below 0° C., and water molecules of the soil are in form of ice crystals.

Pests is defined as any animal or fungus that damage crops or livestock and comprises nematodes, nematode eggs, fungus and fungal spores and any combination thereof.

Weeds is defined as including weed seeds and weed roots.

Plants preferably invasive alien plants are defined as including roots and seeds of these plants. Invasive alien plants are plants that are not naturally found in an area and they are harmful to the nature in the area by displacing plants naturally found in the area, inbreed with local plants of the area and they may carry parasites and diseases with them.

Adapted and configured has the same meaning in the context of this invention, such as a design and components of the device for a particular use, purpose or situation.

During winter roots and seeds from invasive alien plants, fungus, nematodes and weed roots etc. go into low metabolism in order to survive the winter. Pests and weeds contain water molecules. To survive during winter when soil freezes, the pests survive by developing frost proteins, alcohols, sugar content, partial dehydration, seeking shelter in cavities (air), organic matter, protecting itself with mucus and the like. Plants have advanced processes in the fall to prepare for winter.

During winter, when the soil freezes, water molecules in the soil forms ice crystals. The soil structure goes through changes, where the soil top layer may get dried, and lower soil structure expands due to the formation of ice.

The dielectric loss in water is higher compared to ice and is between 100 MHz and 1 THz, where it peaks at 22 GHz, which is the lowest resonance frequency of water. The dielectric permittivity for water at 0° C. is 98 at frequencies below 100 MHz, before it gradually drops to 10 at 100 GHz at 0° C.

In comparison, ice has a dielectric loss between 8-300 kHz, with a resonance frequency around 200 kHz in that area. The dielectric permittivity for ice is 92 at frequencies below 8 kHz and drops gradually to 3.2 at around 300 kHz at 0° C.

Due to the fact that most of the water is in form of ice crystal in frozen soils, this opens up for the use of higher frequencies with less attenuation in the soil, resulting in less energy loss and higher depth penetration for frequencies between 300 kHz and upwards to 20 GHz.

Since the dielectric permittivity is 3.2 in ice, while that of air is 1, the difference is less than in non-frozen soil, and reduces the electromagnetic reflection between air and frozen soil. This causes less reflection and absorption inside air pores in the frozen soil, and less reflection if radiating the electromagnetic field from above the surface, i.e. air to soil reflection.

This makes it possible to reach higher penetration depths in frozen soil with less attenuation thereby reducing or eliminating fungus, fungal spores, nematodes, weed roots and weed seeds, roots and seeds from invasive alien plants, deeper in the ground compared to destruction of pests by irradiation of non-frozen soil.

As described above high frequency microwave radiation do not penetrate deep into the soil due to attenuation of the microwaves in the water comprised in the soil which increased reflection and absorption.

Ice has a lower resonant frequency in the kHz range. Frozen soil will therefore not be affected to the same extent. And the penetration depth is measured down to at least 30 cm depending on frequency.

Furthermore, experimental tests, see FIG. 2*b* and example 1, indicate that frozen soil thaws slower compared to live pests and weeds that reside in the soil during winter.

In contrast, the same experimental test performed on non-frozen soil, FIG. 2*a*, indicates that both the soil and the objects or live pests placed in the soil absorbs the microwaves to a similar extent thus making the process less selective for targeting the pests located in the soil. The heating of the soil and the live pests is slower and prevents the use of high frequency microwaves because of the extensive attenuation.

As explained above, organisms and plants have developed different mechanisms that prevent their intracellular water content from freezing forming ice crystals, thus making them vulnerable to internal heating by attenuation of microwaves, cf. example 2, FIG. 3.

The present invention also provides a devices 1, 21 configured for use in the method according to the first aspect, see FIGS. 1*a* and 1*b*, wherein the device is configured for generating microwave radiation in the range from about 915 MHz to about 24 GHz, such as from about 1.0 GHz to about 10 GHz or such as from about 1.5 GHz to about 5 GHz. The microwave radiation may have a frequency of about 915 MHz.

Alternatively, the microwave radiation generated by the device may have a frequency of about 2.45 GHz. Alternatively, the microwave radiation generated by the device may have a frequency of about 5.8 GHz. Alternatively, the microwave radiation generated by the device may have a frequency of about 24.125 GHz.

The effect generated by the device may be from about 1 kW to about 20 kW, such as about 3 kW, such as from about 1 kW to about 10 kW, such as from about 10 kW to about 50 kW, such as from about 50 kW to about 100 kW, such as from about 10 kW to about 150 kW, such as from about 150 kW to about 200 kW, such as from about 200 kW to about 250 kW or such as from about 250 kW to about 300 kW.

The device 1 according to the present invention for reducing the population of invasive alien plants, pests, weeds and/or grass in frozen soil comprises a high voltage transformer 2, a low voltage transformer for membrane 3, capacitors 4, diodes 5, magnetron 6, waveguide 7, a cooling unit comprising cooling fluid 8.

The device 21 for reducing the population of invasive alien plants, pests, weeds and/or grass in frozen soil comprises a high voltage transformer 22, a low voltage transformer for membrane 23, capacitors 24, diodes 25, magnetron, 3 kW, Waveguide, eg. WR340 27, horn antenna 28.

The device is for illustration purpose only placed on a sledge 10, 20, FIG. 1*a-d*. The sledge wherein the device is mounted is moved at certain speed on the top of the frozen soil. The device may alternatively comprise a propulsion device.

The device is configured for temperatures below 0° C., thus the dimensions of the cooling unit 8, 29 (e.g. radiator), is significantly reduced compared to a cooling unit on a device that operate at temperatures above 0° C. Because as described above, at temperatures below 0° C. the attenuation of the microwaves in soil are significantly reduced therefore the need for a large cooling unit is not required.

The system may comprise a frame or a platform wherein the plurality of devices 1, 21 are mounted underneath the frame or platform, cf. FIG. 1*d*.

The cooling unit (system) 8, 29 may be part of the device 1, 21 or the cooling unit (system) may be mounted on a frame or platform 31 and wherein a plurality of devices are mounted underneath the frame or platform 31 and wherein the cooling unit provides cooling to the plurality of devices.

The sledge 10, 20 may have a hole (not shown) in the area under the waveguide 7 or antenna 28 to allow free way of the microwaves from the horn antenna or the waveguide to the soil.

The present invention may provide a system comprising at least one device 1, 21 as described above, such as a plurality of devices connected in a row.

The device or the system may comprise a propulsion device.

The device or the system may be mounted on a sledge which may pulled by a vehicle such as a tractor.

The device may be moved over the soil at a speed of from about 20 meter/hour to about 20 km/hour.

In one embodiment of the first aspect the device is moved over the soil at a speed of from about 30 meter/hour to about 20 km/hour, such as from about 20 meter/hour to about 50 m/hour, such as from about 50 meter/hour to about 100 m/hour, such as from about 100 meter/hour to about 500 m/hour, such as from about 500 meter/hour to about 1 km/hour, such as from about 1 km/hour to about 5 km/hour, such as from about 5 km/hour to about 10 km/hour or such as from about 10 km/hour to about 20 km/hour.

The effect generated by the device may be varied depending on the speed of the device.

The device may be in direct contact with the frozen soil. Alternatively, the device is not in direct contact with the soil.

Further advantages of the present method is that the microwave generating device 1, 21 configured for use on frozen soil may be less complex and cheaper to produce. Frozen soil cause little attenuation and reflection back towards the microwave generating device. This allows the device to be located in the stronger near field to the soil, thus for example, a horn antenna can be located straight on top of the frozen soil for treatment. Unfrozen soil causes large reflections in the near field, causing more load on the magnetron. This would require additional tuning, having air between the antenna and soil, or using large cooling units or isolator equipment.

A device or system adapted for use on frozen soil solves these issues and simplifies the system.

In a second embodiment the system and the device are according to FIG. 1*b*.

In the second embodiment device 21 are placed in close proximity or direct contact with the frozen soil.

The system according to the second embodiment may comprise at least one device 21.

The system according to the second embodiment may comprise a plurality of devices 21 arranged in one or more rows, cf. FIG. 1*c*, 1*d*.

The system according to the second embodiment may comprise at one or more devices 21 arranged in line after one another.

In one embodiment the device 1 or the device 21 may be configured to provide pulses of microwaves. Providing pulses rather than providing continuous microwaves may reduce energy costs considerably.

Having generally described this invention, a further understanding can be obtained by reference to certain specific examples. The examples illustrate the properties and effects of the of the method according to the invention, and are provided herein for purposes of illustration only, and are not intended to be limiting.

EXAMPLES

Example 1—Experiments Performed in Soil, Temperature Below 0° C.

Test equipment: magnetron delivering microwaves with a frequency of 2450 MHz and an effect of 600 W top down into either frozen soil or non-frozen soil.

Method:

A 600 W 2450 Mhz magnetron (half wave power) was connected to a waveguide. The waveguide output was mounted on the top of a layer of soil comprising non-frozen objects placed in the soil at a depth of 7, 12 and 18 cm. A thermocouple (0.2 mm diameter, type T) was placed in each object, and a reference thermocouple was placed in soil at the same depth as the object.

Microwave irradiation was performed on non-frozen soil and frozen soil and heating of the objects and the surrounding soil was measured.

The results of the tests are depicted in FIGS. 2*a* (non-frozen soil) and 2*b* (frozen soil), clearly demonstrate that there is an insignificant change in temperature of the frozen soil compared to the temperature change observed for non-frozen soil and non-frozen objects comprising moist buried in the soil. Thus, demonstrating that microwave irradiation of frozen soil selectively increases the temperature of non-frozen objects in the soil without melting the surrounding soil.

Example 2—Experiments Performed in Soil, Temperature Below 0° C. with Compost Test equipment: magnetron delivering microwaves with a frequency of 2450 MHz and an effect of 600 W top down into frozen soil with a small garden compost clump buried at 10 cm depth.

Method:

A 600 W 2450 Mhz magnetron (half wave power) was connected to a waveguide. The waveguide output was mounted on the top of a layer of soil comprising a small compost clump buried at a depth of 10 cm. A thermocouple (0.2 mm diameter, type T) was placed in the compost clump.

The soil was frozen down a total of 4 days at a temperature of −4 degrees, where tests were performed at day 2. A secondary control setup, using the same soil, same compost source at the same depth, was frozen down for 4 days at −4 degrees.

Microwave irradiation was performed several times on the frozen test soil, irradiating the compost clump. Several tests like depicted in FIG. 3 were performed, while cooling down the compost between each test back to −4 degrees during day 2.

No irradiation was performed at control sample.

At day 4 the compost clump, and control sample was removed out of the frozen soil in both the control and test setup and thawed at room temperature. Sufficient time at warm temperature was given to re-activate life in the sample. The samples were analyzed under a microscope and compared.

The results showed a reduction of at least 85% of the nematode population in the test sample compared to control sample. Bacterial life was intact at both samples.

Weed roots, weed seeds, nematodes, nematode eggs, fungus and fungal spores and other organisms in the soil have evolved biological processes that produces small amount of energy even at surrounding low temperatures preventing them from dyeing even if the environment is below freezing point of water, i.e. below 0° C.

The above describe experiment clearly demonstrates that microwave radiation selectively target the live nematodes in the soil affecting their ability to survive in the frozen soil.

Example 3—Field Test on *Meloidogyne hapla*

Tests were performed on an agriculture field where a large, homogenous *Meloidogyne hapla* (*M. hapla*) nematode population is present. The soil was frozen to a minimum of 30 cm under winter conditions in Norway.

Test squares were treated by moving the device over the test area. Just before the farmer was about to plough his field during spring, soil samples were taken of the squares. The control square had not been treated during the winter period. Treated square was treated with an average speed of the microwave generating device at 25 m/h).

The results from the field test is shown in FIG. 4. The results clearly demonstrate that using a microwave generating device providing 2.45 Ghz electromagnetic radiation into frozen soil, a condition which does not thaw the soil column, reduces the *M. hapla* population significantly both in the upper 15 cm of the soil column and also further down such as 15-30 cm from the top of the soil.

The invention claimed is:

1. A method for reducing a population of invasive alien plants, pests, weeds and/or grass located in frozen soil, wherein the method comprises:

a. providing a device adapted for generating microwave radiation; and b. irradiating frozen soil comprising invasive alien plants, pests, weeds and/or grass;

wherein temperature of the frozen soil is below 0° C., wherein the method does not thaw the soil, wherein the method prevents destruction of beneficial bacteria in the soil, and the microwave radiation is in the range from about 915 MHz to about 24 GHz.

2. The method according to claim 1 wherein the device comprises a magnetron, a solid-state microwave generator or a Radio Frequency (RF) generator.

3. The method according to claim 2 wherein the device comprises a magnetron.

4. The method according to claim 1, wherein the method reduces the invasive alien plants, pests, weeds and/or grass by at least about 30%.

5. The method according to claim 1, wherein the effect generated by the device is from about 1 kW to about 300 kW.

6. The method according to claim 1, wherein the pests are selected from invasive alien plants, fungus, fungal spores, nematodes, nematode eggs, and any combination thereof.

7. The method according to claim 1, wherein weeds comprise weed seeds and weed roots and wherein invasive alien plants comprise seeds and roots of the plant.

8. The method according to claim 1, wherein the microwave irradiation penetrates at least 10 cm into the ground.

9. The method according to claim 1, wherein the device is moved over the soil at a speed of from about 20 meter/hour to about 20 km/hour.

10. The method according to claim 9 wherein an effect generated by the device is varied depending on the speed of the device.

11. The method according to claim 1, wherein the microwave radiation is in the range from about 1 Ghz to about 10 Ghz.

12. A microwave generating device adapted for use in the method according to claim 1 wherein the device generates microwave radiation in the range from about 915 MHz to about 24 GHz.

13. The device according to claim 12, wherein the device comprises a magnetron, a solid-state microwave generator or a Radio Frequency (RF) generator.

14. The device according to claim 12, wherein components of the device are able to operate at air temperatures below 0° C.

15. The device according to claim 14, wherein components of the device are able to operate at air temperatures from about 0° C. to about −25° C.

16. A system adapted for use in the method according to claim 1 wherein the system comprises at least one microwave generating device, wherein the device generates microwave radiation in the range from about 915 MHz to about 24 GHz.

* * * * *